No. 729,688. PATENTED JUNE 2, 1903.
F. SMITH & E. W. CHECK.
PIG REARING DEVICE.
APPLICATION FILED MAR. 9, 1903.
NO MODEL.
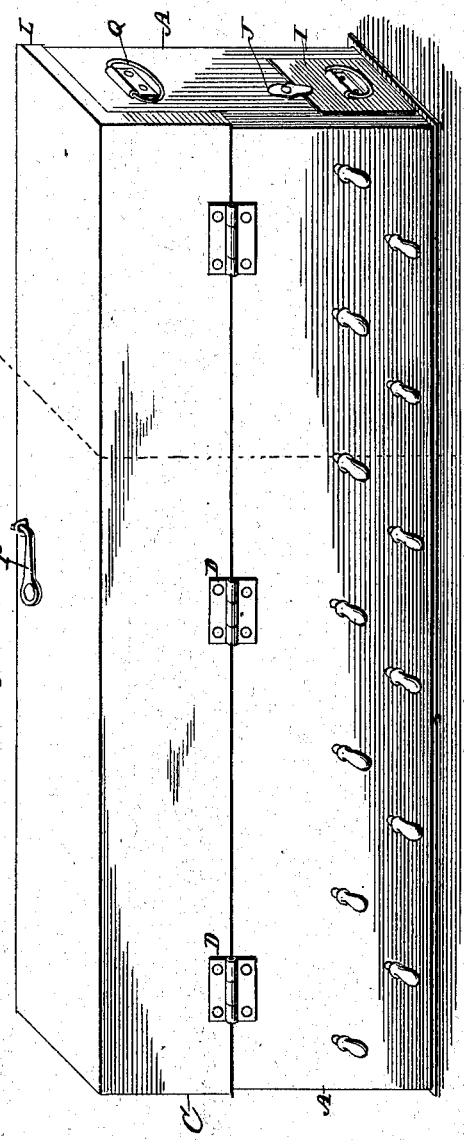
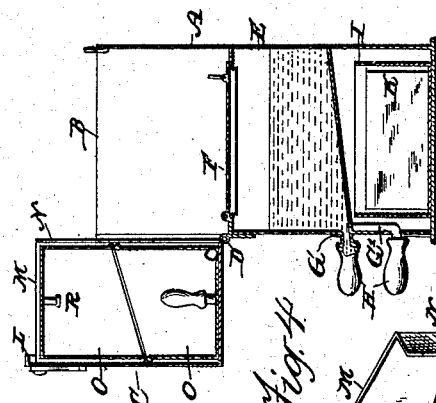
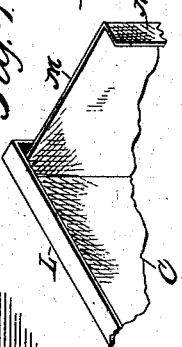
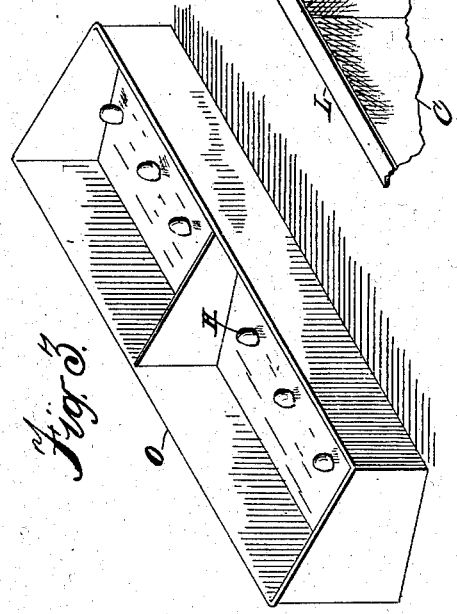
Attest:
J. D. Mateu
F. J. Kubicek
Inventors
Francis Smith
Edward W. Check
By J. M. St. John,
Atty.

No. 729,688. Patented June 2, 1903.

UNITED STATES PATENT OFFICE.

FRANCIS SMITH AND EDWARD W. CHECK, OF CEDAR RAPIDS, IOWA.

PIG-REARING DEVICE.

SPECIFICATION forming part of Letters Patent No. 729,688, dated June 2, 1903.

Application filed March 9, 1903. Serial No. 147,034. (No model.)

*To all whom it may concern:*

Be it known that we, FRANCIS SMITH and EDWARD W. CHECK, citizens of the United States, residing at Cedar Rapids, in the county of Linn and State of Iowa, have invented certain new and useful Improvements in Pig-Rearing Devices, of which the following is a specification.

This invention relates to artificial means for suckling and nurturing young animals, particularly pigs, and comprises apparatus by means of which the young animal may be taken at any age and be easily and safely reared entirely apart from the dam.

In the raising of pigs it often happens that it is not safe or practicable to leave them to the natural care of the dam. She may have the propensity, quite common among sows, of killing her own young. She may be heavy or lazy and smother them by lying on them. She may be sickly or give feverish milk unfit for them or she may die in giving them birth. In all such cases or others in which it is desirable to separate the pigs from the sow artificial means must be employed to suckle the litter or they must perish. It is the purpose of this invention to provide simple and efficient means by which such a litter, however young, may be taken and suckled and after a short period of suckling be taught naturally and easily to drink, when no further special care is required.

The nature of the invention will fully appear from the description and claims following, reference being had to the accompanying drawings, in which—

Figure 1 is a front view in perspective of a device embodying our invention in position for use. Fig. 2 is a cross-section of the same, with the top thrown back, in the plane of the line *a a*. Fig. 3 is a perspective view of one of the drinking-troughs. Fig. 4 shows one corner of the tank-cover and the manner in which the drinking troughs or pans are retained therein when not in use.

In the drawings, A is a rectangular box, made preferably of galvanized iron, and having three compartments. The upper one, B, is open at one side, and is adapted to receive the cover C, which is hinged to the box at D. The middle compartment is a tank for the liquid-food supply and is accessible through the floor of the upper compartment, which is provided with a suitable cover F. From this tank E project short tubular nozzles G, enlarged at the outer ends to take rubber nipples H. These are preferably arranged in a double row and at a suitable height for the young pigs, the lower row communicating with the tank by short tubes G'. The lowest compartment has an opening at one or both ends, preferably both, to take one or two drawers I, which may be fastened in closed position for transportation in any suitable way, as by a button J. In cold weather a heated brick or piece of soapstone K is placed in this drawer and serves to warm the apparatus and the food therein.

The cover C is made with two sides at right angles, as shown, and has flanges L, shutting down outside the box. It is also provided with ends M, which are flanged at N, and in the receptacle so formed are placed two pans O O, by means of which the young animals are weaned from the nipples and taught to drink from a trough. To the bottoms of the pans are secured short studs R, similar in form and size to the nozzles already described, but solid. Over these are placed the nipples as in position for suckling. The pans are then partially filled with the milk or other liquid food with the ends of the nipples exposed, as shown. When it is desired to wean the young animals from suckling, the pans are placed in position for them. They naturally seize the nipples, but get no food from them. In nosing about they dip their snouts in the milk and are soon sipping a little from outside the nipples. From this the step to actual drinking is easy and natural. The nipples are then entirely removed, and the litter drinks from the pans until such time as they may be placed at an ordinary trough.

A simple latch or hasp P serves to hold the cover in closed position, and handles Q at each end of the box permit its being easily carried from place to place.

Having thus described our invention, what we claim as new, and desire to secure by Letters Patent, is—

1. In combination with suckling apparatus, substantially as described, having a receptacle for the weaning device, a weaning device, comprising a food-pan, nipple-studs attached thereto, and removable nipples adapted for attachment to said studs, and projecting normally some distance above the surface of the food.

2. The combination with one or more weaning-pans, substantially as described, of a suckling apparatus, substantially as described, having a hinged cover with a receptacle therein adapted to hold said weaning-pans when not in use.

3. A pig-rearing device, comprising a metal box having a food-tank with nipple-nozzles projecting therefrom, nipples adapted for attachment thereto, drawers below the food-tank adapted to hold warming apparatus, a cover hinged to the box, and with a weaning-pan receptacle therein, one or more weaning-pans provided with nipple-holding studs, handles by which the apparatus is carried, and suitable catches to fasten the cover and drawers, substantially as set forth.

In testimony whereof we affix our signatures in presence of two witnesses.

FRANCIS SMITH.
    EDWARD W. CHECK.

Witnesses:
 F. J. KUBICEK,
 J. M. ST. JOHN.